United States Patent
Kang et al.

(10) Patent No.: US 10,049,596 B2
(45) Date of Patent: Aug. 14, 2018

(54) APPARATUS FOR RECOGNIZING INTENTION OF HORSE-RIDING SIMULATOR USER AND METHOD THEREOF

(71) Applicant: Electronics and Telecommunications Research Institute, Daejeon (KR)

(72) Inventors: Sang Seung Kang, Daejeon (KR); Kye Kyung Kim, Daegu (KR); Su Young Chi, Daejeon (KR); Jae Hong Kim, Daejeon (KR); Jong Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 784 days.

(21) Appl. No.: 14/595,508

(22) Filed: Jan. 13, 2015

(65) Prior Publication Data

US 2015/0196821 A1    Jul. 16, 2015

(30) Foreign Application Priority Data

Jan. 14, 2014    (KR) .................. 10-2014-0004438

(51) Int. Cl.
*G09B 19/00* (2006.01)
*A63G 19/20* (2006.01)

(52) U.S. Cl.
CPC ......... *G09B 19/0038* (2013.01); *A63G 19/20* (2013.01)

(58) Field of Classification Search
CPC ...... G09B 19/0038; G09B 9/00; A63G 19/20; A63B 69/04
See application file for complete search history.

(56) References Cited

U.S. PATENT DOCUMENTS

| 6,808,458 | B1* | 10/2004 | Jung | .................. | A63B 69/04 434/247 |
| 8,579,838 | B2 | 11/2013 | Jang et al. | | |
| 2010/0009762 | A1* | 1/2010 | Takeda | .................. | A63B 69/04 463/47 |

(Continued)

FOREIGN PATENT DOCUMENTS

| JP | 576658 A | 3/1993 |
| KR | 101328688 B1 | 11/2013 |

*Primary Examiner* — Timothy A Musselman
(74) *Attorney, Agent, or Firm* — William Park & Associates Ltd.

(57) ABSTRACT

The present invention relates to an apparatus for recognizing intention of a horse-riding simulator user, and a method thereof, and the apparatus for recognizing intention of a horse-riding simulator user can provide a safe and realistic horse-riding simulation environment to a user by recognizing an aid signal and an intention signal of the user to sense a dangerous situation and accordingly coping with the situation. According to the present invention, it is possible to increase the sense of the real for the user by enabling the horse-riding simulator user to perform similar interaction to actual horse-riding, and to increase effects of horse-riding training using the horse-riding simulator. Particularly, there is an advantage that the dangerous situation is sensed for safe riding, and it is possible to contribute to formation of a related technology market by providing an effective method for recognition of the intention of the horse-riding simulator user.

20 Claims, 4 Drawing Sheets

(56) References Cited

U.S. PATENT DOCUMENTS

2012/0309530 A1* 12/2012 Lansdale ............... A63F 13/213
                                                    463/36
2016/0030827 A1*  2/2016 Greenwood ........... A63B 69/04
                                                    434/247

* cited by examiner

APPARATUS FOR RECOGNIZING INTENTION OF HORSE-RIDING SIMULATOR USER AND METHOD THEREOF

CROSS-REFERENCE TO RELATED APPLICATION

This application claims priority to and the benefit of Korean Patent Application No. 10-2014-0004438, filed on Jan. 14, 2014, the disclosure of which is incorporated herein by reference in its entirety.

BACKGROUND

1. Field of the Invention

The present invention relates to an apparatus for recognizing intention of a horse-riding simulator user and a method thereof, and more specifically, to an apparatus for recognizing intention of a horse-riding simulator user in which the user intention is recognized in a situation of horse-riding simulation, and a method thereof.

2. Discussion of Related Art

In recent years, a horse-riding population steadily increases, but there are environmental constraints for people to learn or enjoy horse-riding for leisure or hobby.

A horse-riding simulator for enabling virtual experience of horse-riding has been devised to overcome such environmental constraints and allow a general person to easily enjoy the horse-riding.

Examples of such a horse-riding simulator include horse-riding exercise equipment that simulates a horse in a simple saddle-based form, and a horse-riding simulator mechanism that simulates an entire shape of an actual horse.

A horse-riding simulator in the related art can be driven by only one or two shafts, and only limited motion is possible.

Therefore, a horse-riding simulator that can be driven by a number of shafts has been widely studied to increase actual feeling effects instead of the limited motion.

A current horse-riding simulator is implemented to move like an actual horse so that similar exercise effects to actual horse-riding is provided to a user.

Accordingly, in the horse-riding simulator, not only hardware (mechanism) implementing similar motion to actual horse-riding based on a multi-shaft configuration, but also software for interaction with a user is very important components.

Further, the horse-riding simulator causes interest of a user by providing content such as games simulating a horse-riding place or a natural environment.

However, a realistic horse-riding simulation environment should be first built so that a user positively uses the horse-riding simulator, as well as the interest of the user is simply caused. Further, a horse-riding simulator simulating feelings of living things, an interface for interaction with a user, or the like should be provided.

Meanwhile, an aid which is an instruction signal from a rider to a horse in the horse-riding is means enabling the horse to recognize user intention.

The aid (signal) may be greatly classified into a main aid and a secondary aid. The main aid includes a sitting aid using gravity center movement of a user weight, a leg aid using legs, a bridle aid using a fist, and the like. The secondary aid uses secondary means, and includes a whip aid, a spur aid, a voice aid, and the like.

These aids are rarely used alone, and a rider may combine some of the aids and deliver his or her intention to a horse.

Therefore, the horse-riding simulator should include recognition means for an aid so as to provide sense of reality such as actual horse-riding to the rider, and further include reflection means capable of reflecting a situation in the horse-riding simulation after recognizing intention of a user.

That is, the horse-riding simulator should be able to recognize the intention of the user and apply user intention information directly selected by the user in the recognized user intention information to a horse-riding simulation environment.

Also, the horse-riding simulator should include security means that senses a dangerous situation to prevent accidents such as falling from a horse and enable safe riding, so that a beginner with no horse-riding experience can safely ride the horse.

Thus, the horse-riding simulator should include the above-described technical elements (functions) to provide a high actual feeling to the user, cause constant interest of the user, and increase effects of education training.

Therefore, there is a need for a method of recognizing an aid signal in a horse-riding simulator, recognizing intention of a user from a horse-riding posture, and sensing and coping with a dangerous situation, as described above.

SUMMARY OF THE INVENTION

The present invention is intended to realize realistic intention delivery between a user and a horse-riding simulator by recognizing intention of the user in a horse-riding simulation environment. An object of the present invention is to provide an apparatus for recognizing intention of a horse-riding simulator user that is capable of providing a safe and realistic horse-riding simulation environment to the user by recognizing an aid signal and an intention signal of the user to sense a dangerous situation and accordingly coping with the situation, and a method thereof.

In order to achieve the above-described object, according to an aspect of the present invention, an apparatus for recognizing intention of a horse-riding simulator user includes a control unit that recognizes intention of an action of a user riding a horse-riding simulator using action detection information of the user and previously stored user intention information, and outputs a control signal based on information on the recognized action intention of the user; and a driving unit that drives the horse-riding simulator according to a control signal of the control unit.

The detection information may include at least one of contact sensing information, voice sensing information, and video sensing information for the action of the user.

The control unit may include a contact information extraction unit that extracts contact feature information indicating a contact feature or contact information including at least one of sitting information, leg information, bridle information, spur information, and whip information as a contact recognition result from the contact sensing information; a voice information extraction unit that extracts voice feature information indicating a voice feature or voice information as a voice recognition result from the auditory sensing information; and a video information extraction unit that extracts video feature information for a posture video of the user or video information as an image recognition result from the video sensing information.

The user intention information may include at least one of a user intention class corresponding to the action of the user, and a user intention aid class corresponding to an instruction signal (aid signal) from a rider to a horse, which is in common use at actual horse-riding.

The control unit may further include: a class generation unit that combines the contact information extracted by the contact information extraction unit, the voice information extracted by the voice information extraction unit, and the video information extracted by the video information extraction unit to generate an extraction information combination class depending on a first previously defined template type; a class matching unit that compares the generated extraction information combination class with the stored user intention class; and a user intention recognition unit that recognizes the intention of the action of the user using a result of comparing the generated extraction information combination class with the stored user intention class.

The class generation unit may combine the contact information extracted by the contact information extraction unit and the voice information extracted by the voice information extraction unit to generate an aid information combination class depending on a second previously defined template type.

The class matching unit may compare the generated aid information combination class with the stored user intention aid class.

The user intention recognition unit may recognize user intention corresponding to the aid signal given to the horse-riding simulator using a result of a comparison between the generated aid information combination class and the stored user intention aid class.

The user intention recognition unit may recognize whether the user is under a dangerous situation using at least one of previously stored safe motion range information and danger expression information, and at least one of the voice information extracted by the voice information extraction unit and the video information extracted by the video information extraction unit, and controls speed of the horse-riding simulator depending on the recognized dangerous situation of the user.

The driving unit may drive a main body of the horse-riding simulator so that the horse-riding simulator operates based on the user intention according to the control signal of the control unit, and selectively drive actual feeling providing devices of the horse-riding simulator so that the horse-riding simulator provides actual feeling effects to the user.

According to another aspect of the present invention, a method of recognizing intention of a horse-riding simulator user includes: recognizing intention of an action of a user riding a horse-riding simulator using action detection information of the user and previously stored user intention information; and controlling an operation of the horse-riding simulator based on information on the recognized action intention of the user.

The detection information may include at least one of contact sensing information, voice sensing information, and video sensing information for the action of the user.

the recognizing of the intention of an action of the user may include extracting contact feature information indicating a contact feature or contact information including at least one of sitting information, leg information, bridle information, spur information, and whip information as a contact recognition result from the contact sensing information; extracting voice feature information indicating a voice feature or voice information as a voice recognition result from the auditory sensing information; and extracting video feature information for a posture video of the user or video information as an image recognition result from the video sensing information.

The user intention information may include at least one of a user intention class corresponding to the action of the user, and a user intention aid class corresponding to an instruction signal (aid signal) from a rider to a horse, which is in common use at actual horse-riding.

The recognizing of the intention of the action of the user may include: combining the extracted contact information, the extracted voice information, and the extracted video information to generate an extraction information combination class depending on a first previously defined template type; comparing the generated extraction information combination class with the stored user intention class; and recognizing the intention of the action of the user using a result of comparing the generated extraction information combination class with the stored user intention class.

The generating of the extraction information combination class may include combining the extracted contact information and the extracted voice information to generate an aid information combination class depending on a second previously defined template type.

The comparing of the user intention class may include comparing the generated aid information combination class with the stored user intention aid class.

The recognizing of the intention of the action of the user using the comparison result may include recognizing user intention corresponding to the aid signal given to the horse-riding simulator using a result of a comparison between the generated aid information combination class and the stored user intention aid class.

The recognizing of the intention of the action of the user using the comparison result may include: recognizing whether the user is under a dangerous situation using at least one of previously stored safe motion range information and danger expression information, and at least one of the extracted voice information and the extracted video information; and controlling speed of the horse-riding simulator depending on the recognized dangerous situation of the user.

The controlling of the operation of the horse-riding simulator may include: driving a main body of the horse-riding simulator so that the horse-riding simulator operates according to the user intention based on information on the recognized action intention of the user; and selectively driving actual feeling providing devices of the horse-riding simulator so that the horse-riding simulator provides actual feeling effects to the user depending on information on the recognized action intention of the user.

According to the present invention, it is possible to increase the sense of the real for the user by enabling the horse-riding simulator user to perform similar interaction to actual horse-riding, and to increase effects of horse-riding training using the horse-riding simulator.

Particularly, there is an advantage that the dangerous situation is sensed for safe riding.

Further, it is possible to contribute to formation of a related technology market by providing an effective method for recognition of the intention of the horse-riding simulator user.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and characteristics of the present invention and a method for achieving the advantages and the characteristics will be apparent by referring to embodiments to be described below in detail with the accompanying drawings. However, the present invention is not limited to the embodiments disclosed below and may be implemented in various different forms. It should be understood, however, that there is no intent to limit the invention to the particular forms disclosed, but on the contrary, the invention is to cover all modifications, equivalents, and alternatives falling within the spirit and scope of the invention. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
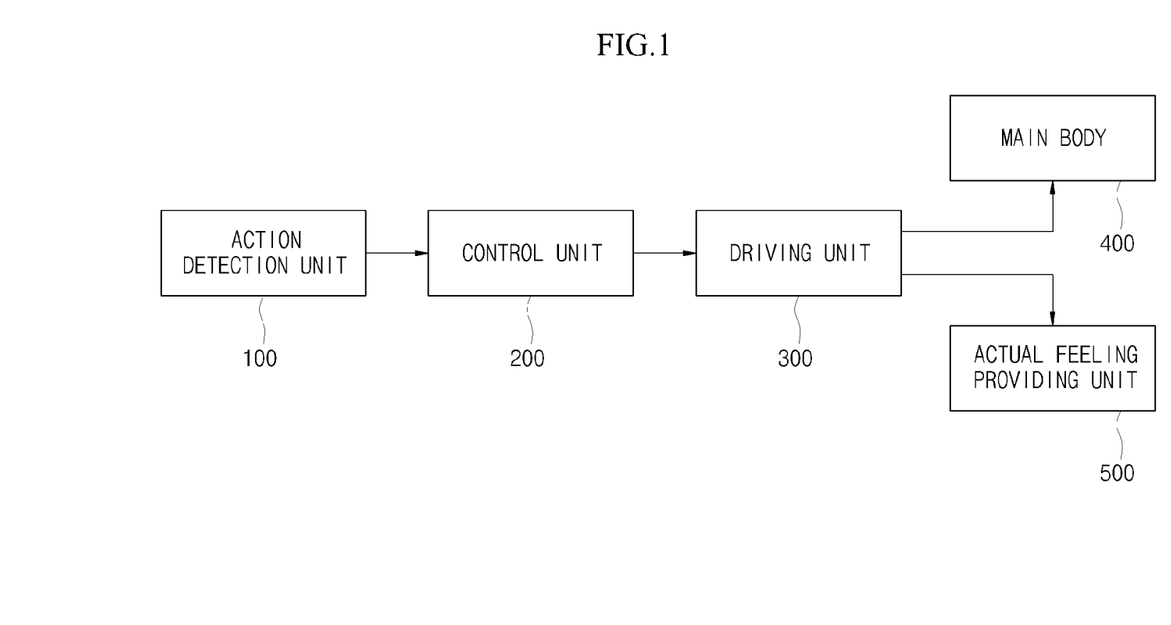
FIG. 1 is a diagram illustrating an apparatus for recognizing intention of a horse-riding simulator user according to an embodiment of the present invention.

Hereinafter, an apparatus for recognizing intention of a horse-riding simulator user according to an embodiment of the present invention will be schematically described with reference to FIG. 1. FIG. 1 is a diagram illustrating an apparatus for recognizing intention of a horse-riding simulator user according to an embodiment of the present invention.

The apparatus for recognizing intention of a horse-riding simulator user according to an embodiment of the present invention includes an action detection unit 100, a control unit 200, and a driving unit 300, as illustrated in FIG. 1.

The action detection unit 100 detects an action of a user who rides the horse-riding simulator in a tactile, auditory, or visual manner.

The control unit 200 compares detection information for the action of the user detected by the action detection unit 100 with previously stored user intention information corresponding to the action of the user, and recognizes intention of the action of the user based on a comparison result. The control unit 200 controls the driving unit 300 so that the horse-riding simulator operates based on the recognized user action intention information. Further, the control unit 200 controls the driving unit 300 so that the horse-riding simulator provides actual feeling effects to the user based on the recognized user action intention information.

The driving unit 300 drives a main body 400 of the horse-riding simulator under control of the control unit 200.

Further, the driving unit 300 drives an actual feeling providing unit 500 under control of the control unit 200.

For example, the actual feeling providing unit 500 may include a vibration generation device that causes minute motion, that is, shaking (vibration) to be generated in the main body of the horse-riding simulator, a display device that displays horse-riding simulation content, an acoustic device that outputs sound such as sound of horse' hoofs or sound of crying of a horse, a spraying device that sprays horse smell, grass smell or the like, and a temperature adjustment device that adjusts temperature of the horse-riding simulator, for example, raises temperature of the main body of the horse-riding simulator, according to motion of the horse-riding simulator or the like.

The driving unit 300 selectively drives each device of the actual feeling providing unit 500 under control of the control unit 200.

Figure 2:
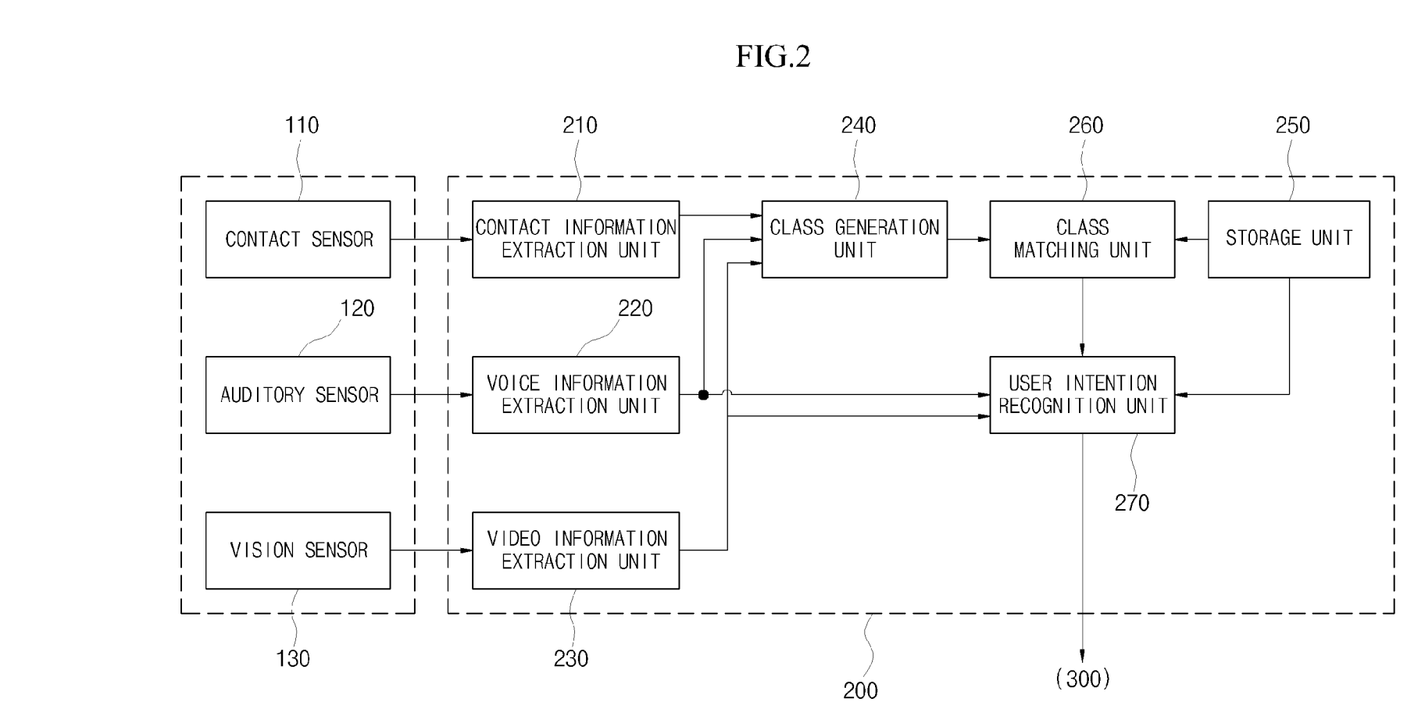
FIG. 2 is a diagram illustrating details of an action detection unit and a control unit of FIG. 1.

Hereinafter, FIG. 1 will be described in greater detail with reference to FIG. 2. FIG. 2 is a diagram illustrating details of the action detection unit and the control unit of FIG. 1.

As illustrated in FIG. 2, the action detection unit 100 includes a contact sensor 110, an auditory sensor 120, and a vision sensor 130.

The contact sensor 110 senses contact with the user. The contact sensor 110 may be mounted on the main body of the horse-riding simulator or a device to be worn by the horse-riding simulator user so as to sense the contact with the user riding the main body of the horse-riding simulator.

The auditory sensor 120 senses voice of the user. The auditory sensor 120 may be mounted on a helmet of the horse-riding simulator or the main body of the horse-riding simulator so as to sense a voice command of the user.

The vision sensor 130 senses a horse-riding posture of the user. The vision sensor 130 may be installed in a position such as the front, the side, or the back of the user so as to acquire an entire or partial horse-riding posture of the user as video sensing information. That is, the vision sensor 130 may be installed in a position in which the entire or partial horse-riding posture of the user can be acquired as the video sensing information.

Using the detection information for the action of the user detected by the action detection unit 100, the control unit 200 recognizes user action intention, and controls the driving unit 300 based on the recognized user action intention information.

Accordingly, the control unit 200 includes a contact information extraction unit 210, a voice information extraction unit 220, a video information extraction unit 230, a class generation unit 240, a storage unit 250, a class matching unit 260, and a user intention recognition unit 270.

The contact information extraction unit 210 extracts contact information from the contact sensing information sensed by the contact sensor 110. Here, the contact information may be represented by contact feature information indicating a feature of the contact or information on a contact recognition result, and includes sitting information, leg information, bridle information, spur information, whip information, and the like.

The voice information extraction unit 220 extracts voice information from the auditory sensing information sensed by the auditory sensor 120. Here, the voice information may be represented by voice feature information indicating a feature of the voice or information on a voice recognition result.

The video information extraction unit 230 extracts video information from the video sensing information sensed by the vision sensor 130. Here, the video information may be represented by video feature information for a posture video of the user or information on a image recognition result.

The class generation unit 240 combines the contact information extracted from the contact information extraction unit 210, the voice information extracted from the voice information extraction unit 220, and the video information extracted from the video information extraction unit 230 to generate an extraction information combination class depending on a first previously defined template type.

Further, the class generation unit 240 combines the contact information extracted from the contact information extraction unit 210 and the voice information extracted from the voice information extraction unit 220 to generate an aid information combination class depending on a second previously defined template type.

The storage unit 250 stores the user intention information corresponding to the action of the horse-riding simulator user as a user intention class.

For example, the action of the horse-riding simulator user is previously defined and converted into a table or an object model. The action of the horse-riding simulator user converted into the table or the object model is stored in the storage unit 250 as the user intention class. The user intention class stored in the storage unit 250 can be updated.

Hereinafter, the user intention class stored in the storage unit 250 will be described in greater detail.

The user intention class includes a departure intention class corresponding to an action of spurring when the horse-riding simulator is in a stop state, an acceleration intention class corresponding to an action of continuously spurring the moving horse-riding simulator, a left turn intention class corresponding to an action of pulling a left portion of the bridle or pulling a left arm, a right turn intention class corresponding to an action of pulling a right portion of the bridle or pulling a right arm, a deceleration or stop intention class corresponding to an action of simultaneously pulling the bridle or an action of pulling back an upper portion of a user body while pulling the bridle, a balancing intention class based on an acceleration or walking method mode corresponding to an action of bending the upper portion forward, a turn intention class corresponding to sitting-based movement action, a propulsive force increase intention class corresponding to an action of leg pressure, and an exercise maintenance intention class corresponding to an action of leg release or bridle release.

Each of the above-described intention classes may include strength information expressed through the action of the user as a parameter.

Further, the storage unit 250 stores an instruction signal (aid signal) from a rider to a horse, which is in common use at actual horse-riding, as a user intention aid class.

The aid signal is greatly classified into a main aid signal and a secondary aid signal. The main aid signal includes a sitting aid signal using gravity center movement of a user weight, a leg aid signal using legs, a bridle aid signal using a fist, and the like. The secondary aid signal uses secondary means, and includes a whip aid signal, a spur aid signal, a voice aid signal, and the like. The rider uses several aid signals at the same time to deliver his or her intention to the horse.

Therefore, the aid signal that is a combination of several aid signals is stored in the storage unit 250 as a user intention aid class.

Further, the storage unit 250 stores safe motion range information for the horse-riding simulator user, voice-based danger expression information, and the like.

Meanwhile, the class matching unit 260 compares the generated extraction information combination class with the intention class stored in the storage unit 250.

Further, the class matching unit 260 compares the generated aid information combination class with the user intention aid class stored in the storage unit 250.

Based on a result of the comparison of the generated extraction information combination class with the stored intention class, the user intention recognition unit 270 recognizes the intention of the action of the user. Using information on the recognized user action intention, the user intention recognition unit 270 controls the driving unit 300.

Further, the user intention recognition unit 270 recognizes the user intention corresponding to the aid signal given from the user to the horse-riding simulator based on the result of comparison between the generated aid information combination class and the stored user intention aid class. Therefore, the user intention recognition unit 270 can recognize the user intention even when the user delivers intention to the horse-riding simulator using the aid signal that is in common use in actual horse-riding. The user intention recognition unit 270 controls the driving unit 300 using the user intention information corresponding to the recognized aid signal.

Meanwhile, the user intention recognition unit 270 can recognize a dangerous situation of the user using at least one of the voice information extracted from the voice information extraction unit 220 and the video information extracted from the video information extraction unit 230 and at least one of the safe motion range information and the danger expression information stored in the storage unit 250.

For example, the user intention recognition unit 270 determines whether motion of the horse-riding simulator user is out of the safe motion range using the safety motion range information stored in the storage unit 250 and the extracted video information. Further, the user intention recognition unit 270 determines whether voice expression of the horse-riding simulator user is included in the danger expression information using the danger expression information stored in the storage unit 250 and the extracted voice information. The user intention recognition unit 270 can recognize the dangerous situation of the horse-riding simulator user based on each determination result.

The user intention recognition unit 270 controls the driving unit 300 to decelerate or stop the horse-riding simulator based on the recognized dangerous situation information so that accidents such as falling from the horse of the horse-riding simulator user can be prevented and the user can safely ride the horse.

As described above, according to the present invention, it is possible to increase the sense of the real for the user by enabling the horse-riding simulator user to perform similar interaction to actual horse-riding, and to increase effects of horse-riding training using the horse-riding simulator. Particularly, there is an advantage that the dangerous situation is sensed for safe riding, and it is possible to contribute to formation of a related technology market by providing an effective method for recognition of the intention of the horse-riding simulator user.

Figure 3A:
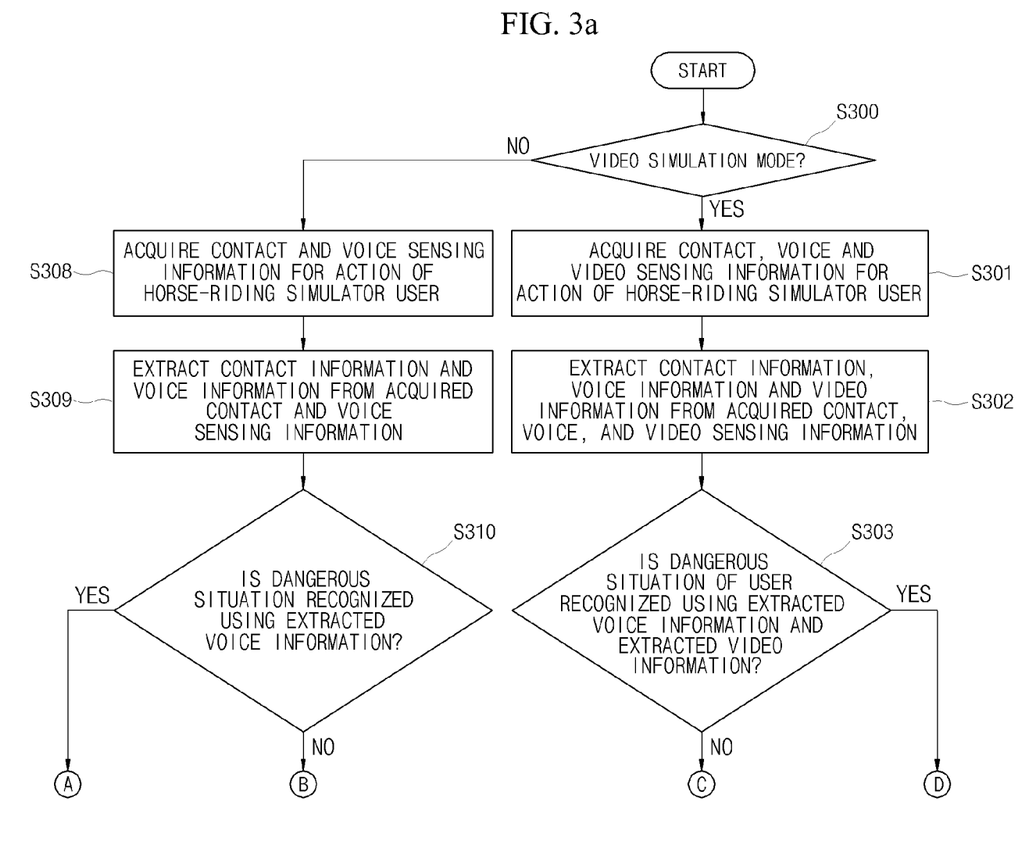
FIGS. 3a and 3b are a flowchart illustrating a method of recognizing intention of a horse-riding simulator user according to an embodiment of the present invention.
Figure 3B:
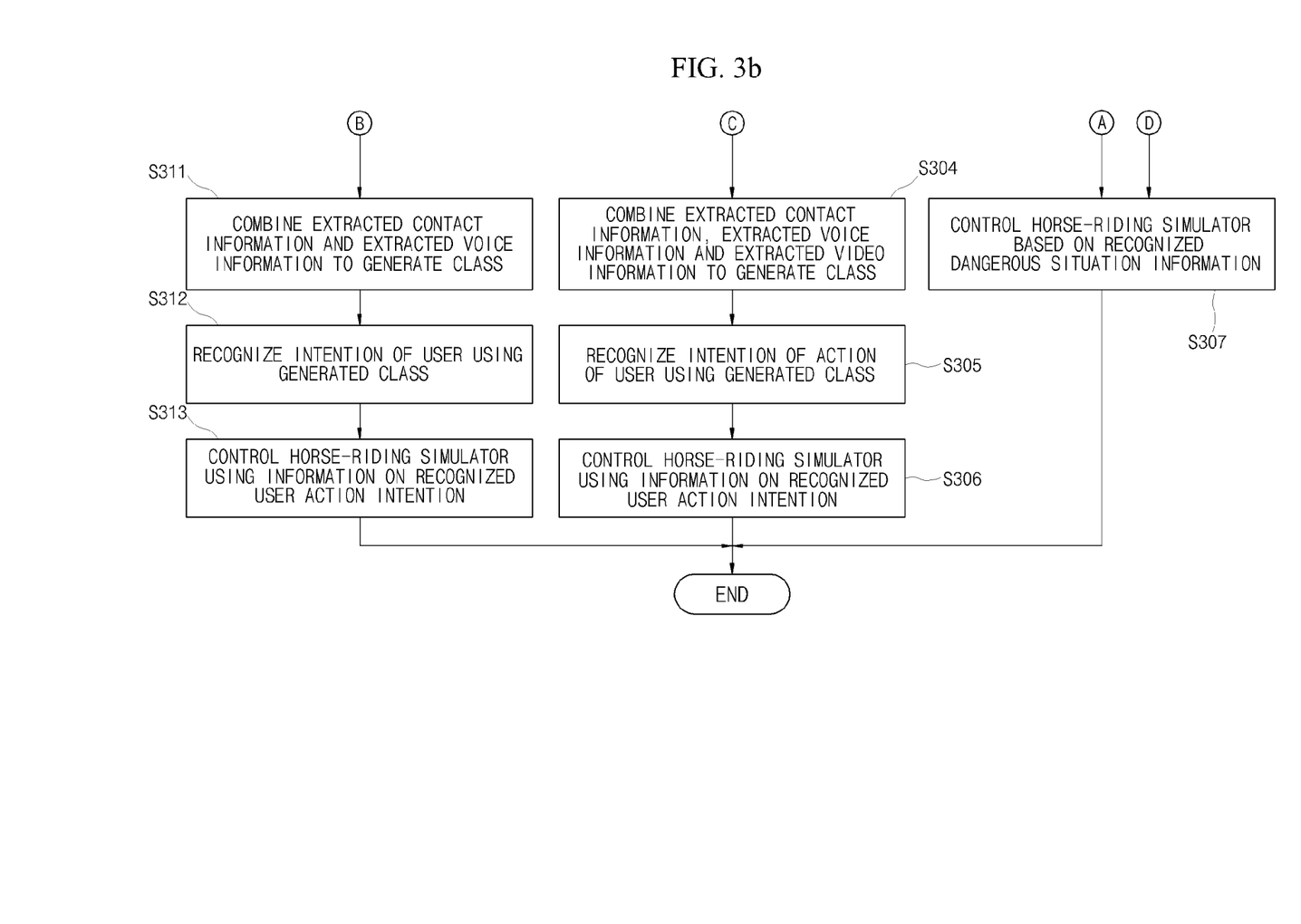

Hereinafter, a method of recognizing intention of a horse-riding simulator user according to an embodiment of the present invention will be described with reference to FIGS. 3a and 3b. FIGS. 3a and 3b are a flowchart illustrating the method of recognizing intention of a horse-riding simulator user according to an embodiment of the present invention.

As illustrated in FIGS. 3a and 3b, in the method of recognizing intention of a horse-riding simulator user according to an embodiment of the present invention, it is determined whether an operation mode of the horse-riding simulator is a video simulation mode (S300).

When it is determined that the operation mode of the horse-riding simulator is a video simulation mode, the contact, voice and video sensing information for the action of the horse-riding simulator user is acquired (S301).

For example, the contact sensor may be mounted on the main body of the horse-riding simulator or a device to be worn by the horse-riding simulator user, and senses contact with the user riding the main body of the horse-riding simulator.

The auditory sensor may be mounted on a helmet of the horse-riding simulator or may be mounted on the main body of the horse-riding simulator, and senses a voice command of the user.

The vision sensor may be installed in a position such as the front, the side, or the back of the user, and acquires an entire or partial horse-riding posture of the user as video sensing information. That is, the vision sensor may be installed in a position in which the entire or partial horse-riding posture of the user can be acquired as the video sensing information.

The contact information, the voice information and the video information are extracted from the contact, voice, and video sensing information sensed by the respective sensors (S302).

For example, the contact information is extracted from the contact sensing information sensed by the contact sensor. Here, the contact information may be represented by contact feature information indicating a feature of the contact or information on a contact recognition result, and includes sitting information, leg information, bridle information, spur information, whip information, and the like.

The voice information is extracted from the auditory sensing information sensed by the auditory sensor. Here, the voice information may be represented by voice feature information indicating a feature of the voice or information on a voice recognition result.

The video information is extracted from the video sensing information sensed by the vision sensor. Here, the video information may be represented by video feature information for a posture video of the user or information on a image recognition result.

Using the extracted voice information and the extracted video information, the dangerous situation of the horse-riding simulator user is recognized (S303).

For example, the safe motion range information for the horse-riding simulator user, the voice-based danger expression information, and the like are stored in the storage unit in advance.

Therefore, the dangerous situation of the horse-riding simulator user can be recognized using the voice information of the horse-riding simulator user and the video information for the horse-riding posture.

That is, it is determined whether motion of the horse-riding simulator user is out of the safe motion range using the extracted video information and the safety motion range information stored in the storage unit. Further, it is determined whether voice expression of the horse-riding simulator user is included in the danger expression information using the extracted voice information and the danger expression information stored in the storage unit. When it is determined that the motion of the horse-riding simulator user is out of the safe motion range and the voice information expressed by the user is included in the danger expression information, the horse-riding simulator user is recognized to be under a dangerous situation.

When the dangerous situation of the horse-riding simulator user is not recognized in step S303, the extracted contact information, the extracted voice information, and the extracted video information are combined to generate an extraction information combination class depending on a first previously defined template type (S304).

Meanwhile, the action of the horse-riding simulator user is stored in the storage unit as the user intention class.

For example, the action of the horse-riding simulator user is previously defined and converted into a table or an object model. The action of the horse-riding simulator user converted into the table or the object model is stored in the storage unit as the user intention class. The user intention class stored in the storage unit can be updated.

Hereinafter, the user intention class stored in the storage unit will be described in greater detail.

The user intention class includes a departure intention class corresponding to an action of spurring when the horse-riding simulator is in a stop state, an acceleration intention class corresponding to an action of continuously spurring the moving horse-riding simulator, a left turn intention class corresponding to an action of pulling a left portion of the bridle or pulling a left arm, a right turn intention class corresponding to an action of pulling a right portion of the bridle or pulling a right arm, a deceleration or stop intention class corresponding to an action of simultaneously pulling the bridle or an action of pulling back an upper portion of a user body while pulling the bridle, a balancing intention class based on an acceleration or walking method mode corresponding to an action of bending the upper portion forward, a turn intention class corresponding to sitting-based movement action, a propulsive force increase intention class corresponding to an action of leg pressure, and an exercise maintenance intention class corresponding to an action of leg release or bridle release.

Each of the above-described intention classes may include strength information expressed through the action of the user as a parameter.

The generated extraction information combination class is compared with the intention class stored in the storage unit, and the intention of the action of the user is recognized based on a result of the comparison of the generated extraction information combination class with the stored intention class (S305).

Using information on the recognized user action intention, the horse-riding simulator is controlled to operate according to the user intention (S306).

For example, the operation of the main body of the horse-riding simulator is controlled so that the horse-riding simulator operates based on the recognized action intention information of the horse-riding simulator user.

Further, using the recognized action intention information of the horse-riding simulator user, the horse-riding simulator is controlled to provide actual feeling effects to the user.

For example, based on the recognized action intention information of the horse-riding simulator user, the actual feeling providing unit of the horse-riding simulator is controlled so that the horse-riding simulator provides actual feeling effects to the user.

Here, the actual feeling providing unit includes a vibration generation device that causes minute motion, that is, shaking (vibration) to be generated in the main body of the horse-riding simulator, a display device that displays horse-riding simulation content, an acoustic device that outputs sound such as sound of horse' hoofs, a spraying device that sprays horse smell, grass smell or the like, and a temperature adjustment device that adjusts temperature of the horse-riding simulator, for example, raises temperature of the main body of the horse-riding simulator, according to motion of the horse-riding simulator or the like.

That is, based on the recognized action intention information of the horse-riding simulator user, the devices included in the actual feeling providing unit are selectively controlled to provide actual feeling effects so that the horse-riding simulator user can feel as if the horse-riding simulator user actually rides a horse.

However, when the dangerous situation of the horse-riding simulator user is recognized in step S303, control is performed to decelerate or stop the horse-riding simulator based on the recognized dangerous situation information so that accidents such as falling from the horse of the horse-riding simulator user can be prevented and the user can safely ride the horse (S307).

On the other hand, when it is determined in step S300 that the operation mode of the horse-riding simulator is not a video simulation mode, that is, that the operation mode of the horse-riding simulator is an aid signal simulation mode, the contact and voice sensing information for the action of the horse-riding simulator user is acquired (S308).

The contact information and the voice information are extracted from the acquired contact and voice sensing information (S309).

The dangerous situation of the horse-riding simulator user is recognized using the extracted voice information (S310).

When the dangerous situation of the horse-riding simulator user is recognized, the extracted contact information and the extracted voice information are combined to generate an aid information combination class depending on the second previously defined template type (S311).

Meanwhile, an instruction signal (aid signal) from a rider to a horse, which is in common use at actual horse-riding, is stored as a user intention aid class.

The aid signal is greatly classified into a main aid signal and a secondary aid signal. The main aid signal includes a sitting aid signal using gravity center movement of a user weight, a leg aid signal using legs, a bridle aid signal using a fist, and the like. The secondary aid signal uses secondary means, and includes a whip aid signal, a spur aid signal, a voice aid signal, and the like. The rider uses several aid signals at the same time to deliver his or her intention to the horse.

Therefore, the aid signal that is a combination of several aid signals is stored in the storage unit as a user intention aid class.

The generated aid information combination class is compared with the user intention aid class stored in the storage unit, and the user intention corresponding to the aid signal given by the user is recognized based on a result of the comparison of the generated aid information combination class with the user intention aid class stored in the storage unit (S312).

Therefore, even when the user delivers the intention to the horse-riding simulator using the aid signal that is in common use in actual horse-riding, the user intention can be recognized.

Control is performed to operate the horse-riding simulator according to the user intention using the recognized intention information corresponding to the aid signal of the horse-riding simulator user (S313).

For example, the operation of the main body of the horse-riding simulator is controlled so that the horse-riding simulator operates based on the recognized intention information corresponding to the aid signal of the horse-riding simulator user.

However, when it is determined in step S310 that the dangerous situation of the horse-riding simulator user is recognized, the process returns to step S307 to perform control to decelerate or stop the horse-riding simulator based on recognized dangerous situation information.

While the configuration of the present invention has been described above in detail with reference to the preferred embodiments and the accompanying drawings, it is understood that this is only illustration, and some variations are possible in a category without departing from technical scope and spirit of the present invention. Therefore, the scope of the present invention is not limited to the described embodiments, and should be determined by not only claims to be described below, but also equivalents to the claims.

DESCRIPTION OF REFERENCE NUMERALS 100 action detection unit
110 contact sensor
120 auditory sensor
130 vision sensor
200 control unit
210 contact information extraction unit
220 voice information extraction unit
230 video information extraction unit
240 class generation unit
250 storage unit
260 class matching unit
270 user intention recognition unit
300 driving unit
400 main body
500 actual feeling providing unit

What is claimed is:

1. An apparatus for recognizing intention of a horse-riding simulator user, the apparatus comprising:
   a control unit that recognizes intention of an action of the user using action detection information of the user riding a horse-riding simulator and previously stored user intention information, and outputs a control signal according to the recognized action intention information of the user; and
   a driving unit that drives the horse-riding simulator according to a control signal of the control unit,
   wherein the control unit is configured to control speed of the horse-riding simulator based upon a recognized dangerous situation of the user.

2. The apparatus according to claim 1, wherein the detection information includes at least one of contact sensing information, voice sensing information, and video sensing information for the action of the user.

3. The apparatus according to claim 2, wherein the control unit includes
   a contact information extraction unit that extracts contact feature information indicating a contact feature or contact information including at least one of sitting information, leg information, bridle information, spur information, and whip information as a contact recognition result from the contact sensing information;
   a voice information extraction unit that extracts voice feature information indicating a voice feature or voice information as a voice recognition result from the auditory sensing information; and
   a video information extraction unit that extracts video feature information for a posture video of the user or video information as an image recognition result from the video sensing information.

4. The apparatus according to claim 3, wherein the user intention information includes at least one of a user intention class corresponding to the action of the user, and a user intention aid class corresponding to an instruction signal (aid signal) from a rider to a horse, which is in common use at actual horse-riding.

5. The apparatus according to claim 4, wherein the control unit further includes:
a class generation unit that combines the contact information extracted by the contact information extraction unit, the voice information extracted by the voice information extraction unit, and the video information extracted by the video information extraction unit to generate an extraction information combination class depending on a first previously defined template type;
a class matching unit that compares the generated extraction information combination class with the stored user intention class; and
a user intention recognition unit that recognizes the intention of the action of the user using a result of comparing the generated extraction information combination class with the stored user intention class.

6. The apparatus according to claim 5, wherein the user intention recognition unit recognizes whether the user is under the dangerous situation using at least one of previously stored safe motion range information and danger expression information, and at least one of the voice information extracted by the voice information extraction unit and the video information extracted by the video information extraction unit, and controls the speed of the horse-riding simulator depending on the recognized dangerous situation of the user.

7. The apparatus according to claim 5, wherein the class generation unit combines the contact information extracted by the contact information extraction unit and the voice information extracted by the voice information extraction unit to generate an aid information combination class depending on a second previously defined template type.

8. The apparatus according to claim 7, wherein the class matching unit compares the generated aid information combination class with the stored user intention aid class.

9. The apparatus according to claim 8, wherein the user intention recognition unit recognizes user intention corresponding to the aid signal given to the horse-riding simulator using a result of a comparison between the generated aid information combination class and a stored store intention aid class.

10. The apparatus according to claim 1, wherein the driving unit drives a main body of the horse-riding simulator so that the horse-riding simulator operates based on the user intention according to the control signal of the control unit, and selectively drives actual feeling providing devices of the horse-riding simulator so that the horse-riding simulator provides actual feeling effects to the user.

11. A method of recognizing intention of a horse-riding simulator user, the method comprising:
recognizing intention of an action of the user using action detection information of the user riding a horse-riding simulator and previously stored user intention information; and
controlling an operation of the horse-riding simulator according to the recognized action intention information of the user,
wherein controlling the operation comprises controlling speed of the horse-riding simulator based upon a recognized dangerous situation of the user.

12. The method according to claim 11, wherein the detection information includes at least one of contact sensing information, voice sensing information, and video sensing information for the action of the user.

13. The method according to claim 12, wherein the recognizing of the intention of an action of the user includes
extracting contact feature information indicating a contact feature or contact information including at least one of sitting information, leg information, bridle information, spur information, and whip information as a contact recognition result from the contact sensing information;
extracting voice feature information indicating a voice feature or voice information as a voice recognition result from the auditory sensing information; and
extracting video feature information for a posture video of the user or video information as an image recognition result from the video sensing information.

14. The method according to claim 13, wherein the user intention information includes at least one of a user intention class corresponding to the action of the user, and a user intention aid class corresponding to an instruction signal (aid signal) from a rider to a horse, which is in common use at actual horse-riding.

15. The method according to claim 14, wherein the recognizing of the intention of the action of the user includes:
combining the extracted contact information, the extracted voice information, and the extracted video information to generate an extraction information combination class depending on a first previously defined template type;
comparing the generated extraction information combination class with the stored user intention class; and
recognizing the intention of the action of the user using a result of comparing the generated extraction information combination class with the stored user intention class.

16. The method according to claim 15, wherein the recognizing of the intention of the action of the user using the comparison result includes:
recognizing whether the user is under the dangerous situation using at least one of previously stored safe motion range information and danger expression information, and at least one of the extracted voice information and the extracted video information; and
controlling the speed of the horse-riding simulator depending on the recognized dangerous situation of the user.

17. The method according to claim 15, wherein the generating of the extraction information combination class includes combining the extracted contact information and the extracted voice information to generate an aid information combination class depending on a second previously defined template type.

18. The method according to claim 17, wherein the comparing of the user intention class includes comparing the generated aid information combination class with the stored user intention aid class.

19. The method according to claim 18, wherein the recognizing of the intention of the action of the user using the comparison result includes recognizing user intention corresponding to the aid signal given to the horse-riding simulator using a result of a comparison between the generated aid information combination class and a stored store intention aid class.

20. The method according to claim 11, wherein the controlling of the operation of the horse-riding simulator includes:
- driving a main body of the horse-riding simulator so that the horse-riding simulator operates according to the user intention based on the recognized action intention information of the user; and
- selectively driving actual feeling providing devices of the horse-riding simulator so that the horse-riding simulator provides actual feeling effects to the user depending on the recognized action intention information of the user.

* * * * *